June 9, 1942. W. F. HEROLD 2,285,656
TRUCK CASTER
Filed March 15, 1941 2 Sheets-Sheet 1

Inventor
Walter F. Herold,
By Rockwell Bartholow
Attorneys

June 9, 1942.  W. F. HEROLD  2,285,656
TRUCK CASTER
Filed March 15, 1941  2 Sheets-Sheet 2

Inventor
Walter F. Herold,
By Rockwell Bartholow
Attorneys

Patented June 9, 1942

2,285,656

UNITED STATES PATENT OFFICE 2,285,656

TRUCK CASTER

Walter F. Herold, Easton, Conn., assignor to The Bassick Company, Bridgeport, Conn., a corporation of Connecticut Application March 15, 1941, Serial No. 383,539

7 Claims. (Cl. 16—44)

This invention relates to truck casters and other heavy duty casters or wheels.

One object of my invention is to provide a simple resilient mounting for a caster wheel which takes up shocks and makes the truck easier running and easier to control.

It is desired to provide an inexpensive satisfactory device associated with the ends of the wheel axle whereby the wheel is resiliently mounted relatively to its horn, fork, or other wheel support.

I prefer to provide cushioning members of rubber associated with the support for the wheel at the respective sides of the wheel, and one of my objects is to provide a device of this type which is simpler, more practical and less expensive than those previously proposed.

To these and other ends the invention consists in the novel features and combinations of parts to be hereinafter described and claimed.

In the accompanying drawings.

Figure 5:
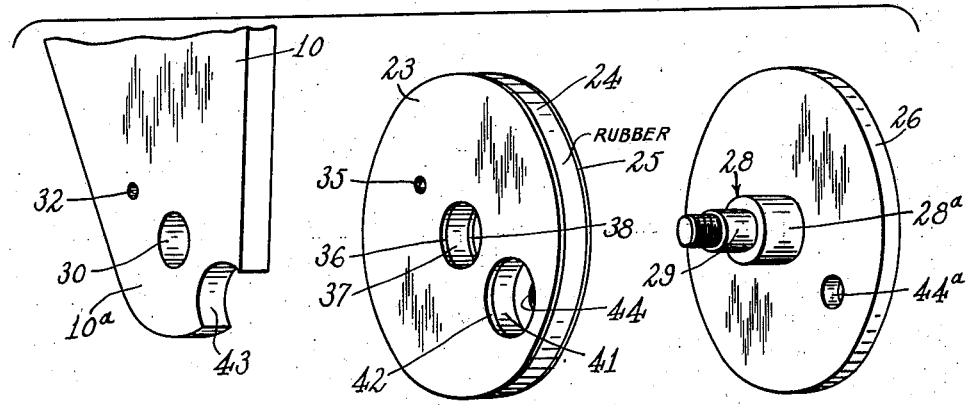

Fig. 5 an exploded perspective view of certain parts of the assemblage.

I have illustrated my invention as applied to heavy duty truck casters in which the usual swivelled supporting horn or fork is employed and in which the caster wheel is a heavy metal wheel rotating on anti-friction bearings and having an axle member, the ends of which are supported from the horn legs.

In carrying out my invention the ends of the axle are supported from the supporting legs by means of torsion joints permitting a cushioned up and down movement of the wheel in its support, these torsion joints having cushioning members of rubber or rubber like material. In the particular form selected for illustration these rubber members are in the form of disks, each disk being fixed at opposite faces respectively to relatively movable parallel plate members of the joint, the action of the joint being effective to twist each rubber disk relatively to an axis disposed at the disk center. As the wheel axle is connected to one of the plates at a point eccentric to the disk axis, the necessary cushioned movement of the wheel is permitted.

In the drawings the supporting horn is shown at 10, this horn being swivelled by a pin 11 to an upper plate 12. The caster wheel is shown at 13, and this wheel may have a metal rim 14 and central web 15 and a hub 16 all integral with each other. The hub 16 has a central bore 17 and within the latter are means for mounting the wheel rotatably with respect to an axle member 18. In the particular case illustrated, a sleeve member 19 embraces the axle member, and between the sleeve member and a hub portion of the wheel, anti-friction bearing members such as rollers 20 are inserted. The ends of the axle member project somewhat beyond the ends of the wheel hub, and it is in connection with these projecting ends of the axle member that the torsion joints above mentioned are employed, these joints connecting the axle member resiliently with the lower end portions 10ª of the horn legs.

The axle member 18 is preferably in the form of a bolt having a fixed head 21 at one end and a nut 22 at the opposite end. By means of the bolt head 21 and the nut 22 the bolt is connected to the respective torsion joints.

In the form shown, each torsion joint comprises an outer plate 23 adapted to be connected to the corresponding horn leg, an intermediate resilient rubber member 24 of disk form, an inner plate 25 adapted to be connected to the axle bolt, and a plate or disk 26 which is connected to the axle bolt and which also provides a mounting for the torsion joint in the corresponding horn leg. Means such as a small bolt 27 may be employed for fastening the plate 23 to the adjacent face of the horn leg. The plate 26 carries a stud or post 28 which projects through and centers the plates of the torsion joint structure and has a bearing portion 29 in a hole 30 adjacent the lower end of the supporting leg, and this bearing portion is positioned in this hole by a nut 31 having threaded engagement with the end of the post 28.

The small bolt 27 previously mentioned passes through a hole 32 in the leg and this bolt has a fixed head 33 at the inner face of plate 23, and at its outer end, in engagement with the supporting leg, bolt 27 has a nut 34 threaded thereon. Bolt 27 passes through plate 23 by way of a small hole 35 in said plate (Fig. 5).

Figure 3:
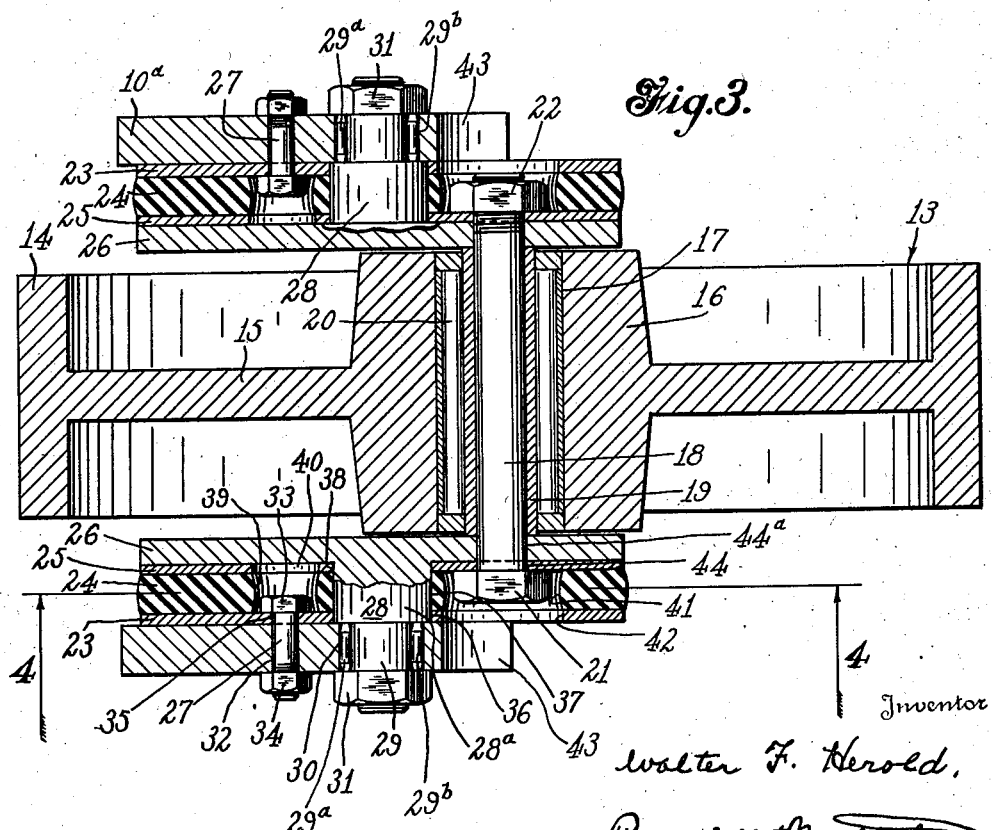
Fig. 3 is an enlarged section on line 3—3 of Fig. 1.
Figure 4:
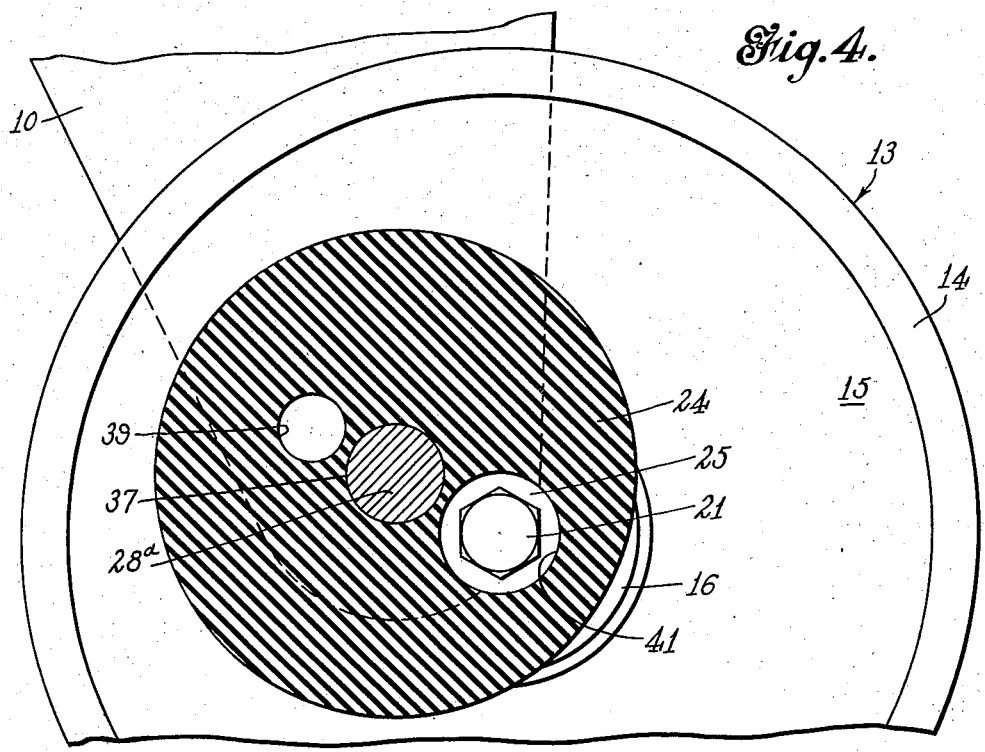
Fig. 4 is a section on line 4—4 of Fig. 3.

At the center of plate 23 is a hole 36, and corresponding holes 37 and 38 are formed in the rubber disk and in plate 25 so that said parts can embrace a cylindrical bearing portion 28ᵃ of stud 28. The head 33 of bolt 27 is received with clearance in a round hole 39 formed in the rubber disk, and concentric with this hole 39 is a hole 40 in plate 25. By way of these holes 39 and 40, bolt 27 can be inserted into the torsion joint structure. The rubber disk 24 is also provided with a large hole 41 and the plate 23 with a concentric hole 42, these holes providing an open socket associated with the outer face of the torsion element accommodating the corresponding end of bolt 18 and permitting assemblage of the parts in the arrangement shown in Fig. 3. In order to permit this assemblage in a convenient manner it is also desirable that the end portion of the supporting leg have a notch or cut away portion 43 which in the normal position of the parts lines up with the holes 41 and 42 and permits the bolt head or the bolt nut to be moved into place. The body of the bolt is accommodated in a hole 44 in each of the inner plates 25 and also in a hole 44ᵃ in each of the plates 26.

All of that portion of rubber disk 24 which lies against plate 23 is bonded to it so that the plate and disk at their adjacent faces are permanently interconnected, and a similar connection exists between the opposite face of the rubber disk and the plate 25 at that side.

The cylindrical portion 28ᵃ of stud 28 acts as a centering hub closely fitting the central openings of the plates 23 and 25 so that these plates can turn relatively to each other on the axis of the hub and in so doing exert a twisting action on the rubber disk. The plate 25 is held against angular movement relatively to the metal disk 26 by the axle bolt passing through these members at a point offset from the center; and similarly the plate 23 and the horn leg 10ᵃ, which are both engaged with the stud of the metal disk 26, are held against angular movement relatively to each other by the eccentrically located bolt 27 or its equivalent.

The portion 29 of the stud may have suitable antifriction members such as small rollers 29ᵃ interposed between it and the inner surface of the hole 29ᵇ of the horn leg through which the stud extends. The nut 31 on the end of the stud is adapted to hold a portion of the horn leg extending around the hole 29ᵇ against the shoulder provided by the outer end portion of the part or hub 28ᵃ.

In assembling the device, the disk-like elements comprising inner and outer plates 23, 25 and interposed rubber disk 24, are first assembled with respect to the supporting legs by being placed against the latter and bolted thereto. The metal disks 26 are then placed in position. The wheel is then inserted between the metal disks 26 and the wheel axle placed in position, making use of the cut-out portions of the lower leg ends and the adjacent cut-out or socket portions of the disk-like torsion elements.

Figure 1:
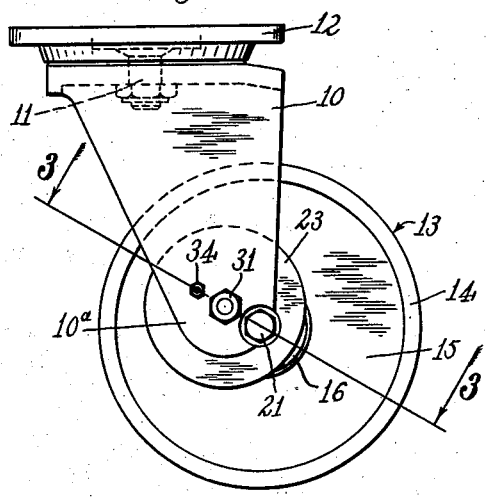
Fig. 1 is a side elevation of a truck caster embodying my improvements, showing the same in a position in which it carries no load.
Figure 2:
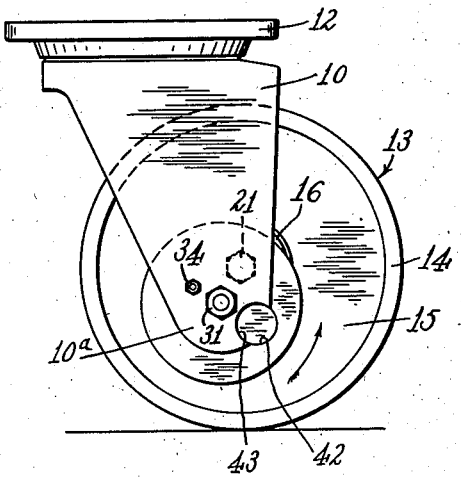
Fig. 2 is a similar view showing the caster under load, with the wheel moved upwardly to a substantial degree relatively to the legs of the horn.

When the parts are assembled, they have the position shown in Fig. 1, in which position the wheel is freely suspended, i. e. carries no load. When the caster is subjected to load, the wheel is pressed upwardly in a resilient manner to an extent depending upon the loading. Fig. 2 shows a position such as would be assumed by the wheel in passing over a bump of considerable size. The wheel axle, being secured to and carried by parts of the disk-like torsion elements or assemblies downwardly off-set from the centers of the latter, may be swung upwardly on the axis of the stud members 28 in the direction of the arrow, Fig. 2, in order to give the wheel a cushioned lifting motion. In this action the plates 23 are stationary but the inner plates 25 are rotated so as to twist and tension the rubber disks. This builds up a considerable amount of tension or reaction in the rubber disks which is progressively increased as the wheel moves up. As soon as the wheel passes beyond the bump it is pressed downwardly in order to maintain its tread surface in engagement with the ground over which it is traveling. In this manner a very effective cushioning action is provided and the caster given a very satisfactory compensating action.

The rubber disks or plates can be provided at relatively small expense and the cushioning device in its entirety is of simple, inexpensive construction. It is understood, of course, that in making the disk-like torsion elements comprising the inner and outer plates with the interposed rubber disk, the rubber can be vulcanized and bonded to the plates by methods well known in the art. The members comprising the disks 26 with their studs act as satisfactory means for assisting in mounting the torsion joint assemblies with respect to the wheel structure, and more particularly the wheel axle, and they also act as satisfactory means for assisting in mounting the torsion joint assemblies from the supporting legs and also as a means for centering the torsion joint elements during the operation of twisting and stressing the rubber.

By providing the torsion elements with suitable cut away portions or sockets as above described, the axle bolt or its nut can be assembled from one face of the torsion element, whereas the mounting means, such as the bolt, for fastening the torsion element to the supporting leg can be inserted from the other face.

While I have shown a preferred form of my invention it will be understood that the same can be embodied in many other forms and that various modifications and changes in the organization of parts and in the details can be made without departing from the principles of my invention or the scope of the claims.

What I claim is:

1. In a truck caster, the combination of a wheel, an axle carried thereby and projecting therefrom, end supports having free extremities, and torsion devices including rubber disks interposed between the extremities of said supports and the axle ends and permitting a cushioned upward movement of the wheel, said torsion devices also including inner and outer plates bonded to the disks, and disk-like members mounting said plates and disks from said end supports.

2. In a truck caster, the combination of a wheel, an axle carried thereby and projecting therefrom, end supports and torsion devices including rubber disks interposed between said supports and the axle ends and permitting a cushioned upward movement of the wheel, said torsion devices also including inner and outer plates bonded to the disks, and said torsion devices further including disk-like centering members for the plates having stud members projecting through said plates and fastened in said end supports.

3. In a truck caster, the combination of a wheel, an axle carried thereby and having its ends projecting beyond the sides of the wheel, members associated with the end portions of the axle having laterally projecting studs, supporting members for the wheel in which said studs are engaged, and torsion devices for mounting the ends of the axle in a cushioned manner comprising concentric elements centered by said studs.

4. In a truck caster the combination of a wheel, an axle carried thereby and having its ends projecting beyond the sides of the wheel, members associated with the end portions of the axle having laterally projecting studs, supporting legs for the wheel in which said studs are engaged, and torsion devices for mounting the ends of the axle in a cushioned manner comprising concentric elements centered by said studs, one of said elements being a rubber torsion plate.

5. In a truck caster, the combination of a wheel, an axle projecting beyond the sides of the wheel, supporting legs, supporting members carrying the wheel axle eccentrically and having concentric supporting engagement with the legs to support the wheel from the legs, and disk-like torsion elements interposed between said supporting members and the inner faces of the supporting legs, said supporting members having studs connecting them to the legs and centering the disk-like torsion elements.

6. A torsion joint assembly for truck casters and the like, comprising a disk-like plate with a projecting stud, and disk-like elastic torsion element having a central aperture by which it is in removable engagement with said stud, said element comprising outer plates and an inner thin disk of rubber bonded thereto, each outer plate of said element having eccentric means of connection for an extraneous member, and said stud extending through and beyond the centering aperture.

7. In a truck caster, a wheel, an axle therefor projecting at the ends beyond the sides of the wheel, two plates with an interposed interbonded rubber disk arranged transversely at each end of the axle, the axle being extended through the inner plate and fastened thereto by means of a fastener, said fastener being located within a clearance recess in the rubber disk, each rubber disk adapted to be twisted about a horizontal axis somewhat above the axle for resiliently supporting the axle, and means for supporting said plates and disks so that the wheel is supported and the disks can be so twisted.

WALTER F. HEROLD.